United States Patent
Schönebeck

(10) Patent No.: US 6,869,137 B2
(45) Date of Patent: Mar. 22, 2005

(54) VEHICLE ROOF

(75) Inventor: Horst Schönebeck, Gelnhausen (DE)

(73) Assignee: ArvinMeritor GmbH (DE)

(*) Notice: Subject to any disclaimer, the term of this patent is extended or adjusted under 35 U.S.C. 154(b) by 0 days.

(21) Appl. No.: 10/726,844

(22) Filed: Dec. 3, 2003

(65) Prior Publication Data

US 2004/0124673 A1 Jul. 1, 2004

(30) Foreign Application Priority Data

Dec. 9, 2002 (DE) .......................... 102 57 398

(51) Int. Cl.⁷ .......................................... B62D 25/06
(52) U.S. Cl. ....................................................... 296/210
(58) Field of Search ........................................ 296/210

(56) References Cited

U.S. PATENT DOCUMENTS

| | | | |
|---|---|---|---|
| 4,475,765 A | * 10/1984 | Vogt et al. ............... | 296/210 |
| 2002/0005656 A1 | * 1/2002 | Seifert ....................... | 296/210 |
| 2003/0122405 A1 | * 7/2003 | Stallfort et al. ............ | 296/210 |
| 2004/0094992 A1 | * 5/2004 | Bohm et al. ............... | 296/210 |

FOREIGN PATENT DOCUMENTS

| | | |
|---|---|---|
| DE | 197 09 016 A | 9/1998 |
| JP | 62 199 574 A | 2/1988 |
| JP | 9 109 926 A | 8/1997 |
| JP | 9 175 429 A | 11/1997 |
| JP | 10 167 114 A | 9/1998 |
| JP | 2000062646 A | 2/2000 |
| JP | 200 142 469 A | 10/2000 |
| JP | 2002 264 839 A | 1/2003 |
| WO | WO 0142051 A | 6/2001 |
| WO | WO 03045762 A | 6/2003 |

OTHER PUBLICATIONS

Search report, Austrian Patent Office, dated May 9, 2003.
European Search Report, Mar. 29, 2004.

* cited by examiner

*Primary Examiner*—Lori L. Coletta
(74) *Attorney, Agent, or Firm*—Carlson, Gaskey & Olds

(57) ABSTRACT

A vehicle roof having a roof frame and a roof module permanently and fixedly attached to the roof frame has a rigid safety element on the lower side of the roof module. The safety element engages the roof frame and holds the roof module on the roof frame in the event of a plastic deformation of the roof frame.

42 Claims, 3 Drawing Sheets ative at the edge. In one embodiment, the roof module is fastened

VEHICLE ROOF

REFERENCE TO RELATED APPLICATIONS

The present invention claims the benefit of German Patent Application No. 102 57 398.0, filed Dec. 9, 2002.

TECHNICAL FIELD

The present invention relates to a vehicle roof having a roof frame and a roof module that permanently and fixedly attached to the roof frame. More particularly, the invention is directed to a vehicle roof having a roof frame with an edge that points inwardly toward the roof module.

BACKGROUND OF THE INVENTION

Currently available vehicle roof designs are moving away from structures incorporating a sheet metal roof that is welded to a roof frame or configured as an integral part thereof. Newer designs increasingly make use of a roof frame on which a roof module, which is manufactured by a supplier, is permanently and fixedly attached via glue and/or screws or other fasteners. Note that even though the roof is still permanently and fixedly attached, it does not exclude the possibility that the roof module, for purposes of replacement, can be separated from the frame in a workshop and replaced by a new roof module that is again is permanently and fixedly attached to the roof frame.

In this context, the roof module is customarily made of plastic and has an exterior skin made of, for example, an aluminum or plastic film attached to a foam backing. The roof module must remain attached to the roof frame even in the event of an impact and a heavy deformation of the roof frame. In case of a lateral impact, which may be simulated by a pole impact test, the immediate result is often a deformation of the roof frame. Therefore, great demands are placed on the attachment of the roof module to the vehicle roof.

There is a desire for an attachment structure that can attach the roof module to the roof frame in a manner that can withstand high impacts regardless of the impact direction.

SUMMARY OF THE INVENTION

The invention is directed to a vehicle roof having an improved connection between the roof module and the roof frame. In the case of a vehicle roof of the type described above, the roof module comprises a rigid safety element in its lower side. The rigid element has at least one protruding portion that points to the adjoining edge and that is positioned lower than the adjoining edge. The rigid safety element provides a form-locking latching structure if the roof frame deforms and also reinforces the roof module itself.

If the roof frame, with its edge pointing inward, (i.e., toward the safety element) is horizontally displaced during a deformation, then the edge moves over the protruding portion of the roof module so that the safety element engages the edge from behind. As a result, the roof module is prevented from lifting off from the roof frame even if the attachment of the roof frame to the roof module is partially destroyed. In the case of a non-deformed roof frame, the protruding portion lies lateral to the edge and therefore does not yet grasp the edge from behind. This enables the roof module to be placed onto the roof frame from above. The safety element, however, is situated almost directly bordering the edge so that the edge caught by the safety element even if a small deformation of the roof frame occurs.

In one embodiment, the edge is a flange-like, inward-pointing extension of the roof frame. The roof frame is a hollow section, and a thin sheet metal flange protrudes horizontally to the inside and preferably continuously surrounds the hollow section. The flange serves to attach, center and support the roof module. In one embodiment, the sheet metal flange is at the edge of the roof frame, and the safety element engages under the flange if the roof frame deforms.

The roof module is advantageously fastened to this flange at the edge. In one embodiment, the roof module is fastened to the flange by glue and screw connections. An appropriate adhesive bead may run continuously around the edge in accordance with one embodiment.

The safety element may be, for example, a sheet metal part.

According to one embodiment, the safety element is at least partially embedded in a foam backing under the exterior skin of the roof module. This embedding can also be conducted so that the safety element is entirely embedded in the foam backing to anchor the safety element firmly in the foam backing. However, the foam backing does not exert great resistance against the horizontally displaceable edge when the roof frame deforms, allowing the edge to penetrate into the foam and move over the protruding portion of the safety element, which is situated below the edge.

In one embodiment, the safety element is a hollow section that is open towards the edge of the roof frame. The hollow section receives the edge if there is a horizontal displacement of the edge toward the safety element. If the roof frame deforms, the hollow section provides a form-locking connection in the vertical direction both upwardly and downwardly. In addition, the hollow section transmits force into the foam over a large area and prevents the foam from being split as the edge penetrates into the foam. In one embodiment, the safety element is advantageously a C-profile or a double-T profile, for example.

If the safety element runs around the lower side of the roof module, it can also serve as a reinforcement frame, thereby providing a dual function.

BRIEF DESCRIPTION OF THE DRAWINGS

Further features and advantages of the present invention will be apparent from the following description and the following drawings, to which reference is made and in which.

DETAILED DESCRIPTION OF THE EMBODIMENTS

Figure 1:
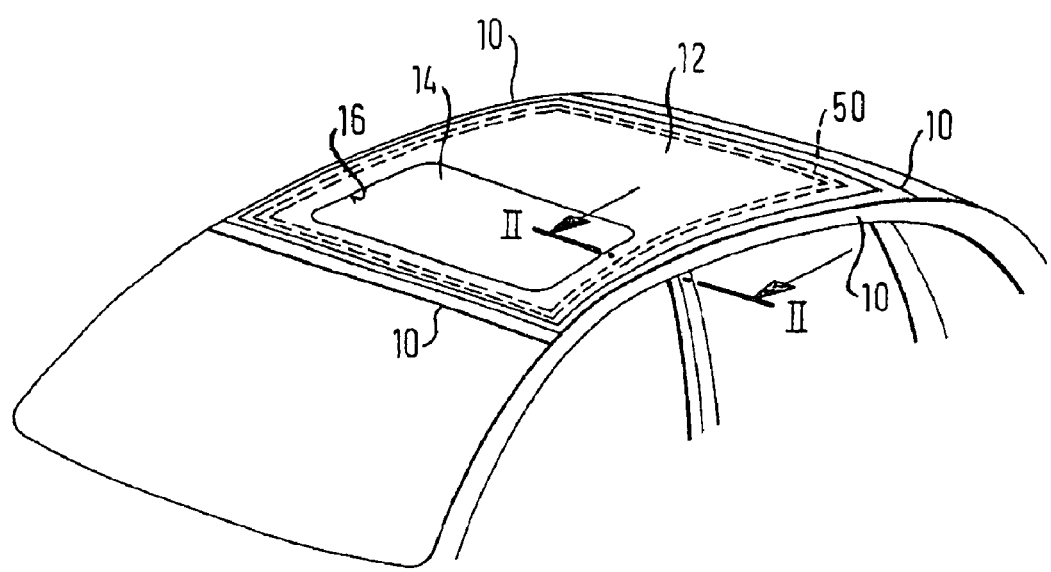
FIG. 1 is a top view of a vehicle roof according to one embodiment of the invention.

FIG. 1 shows a vehicle roof having a continuously surrounding roof frame 10. A roof frame 10 supports a roof module 12 is placed onto it from above. The roof module 12 and is permanently and fixedly attached to the roof frame, i.e., roof module 12 cannot be displaced with respect to roof frame 10. The roof module 12 may have a roof portion 16 that is closeable by a movable cover 14 so that the roof module 12 can contain an integrated sliding-roof system.

Figure 2:
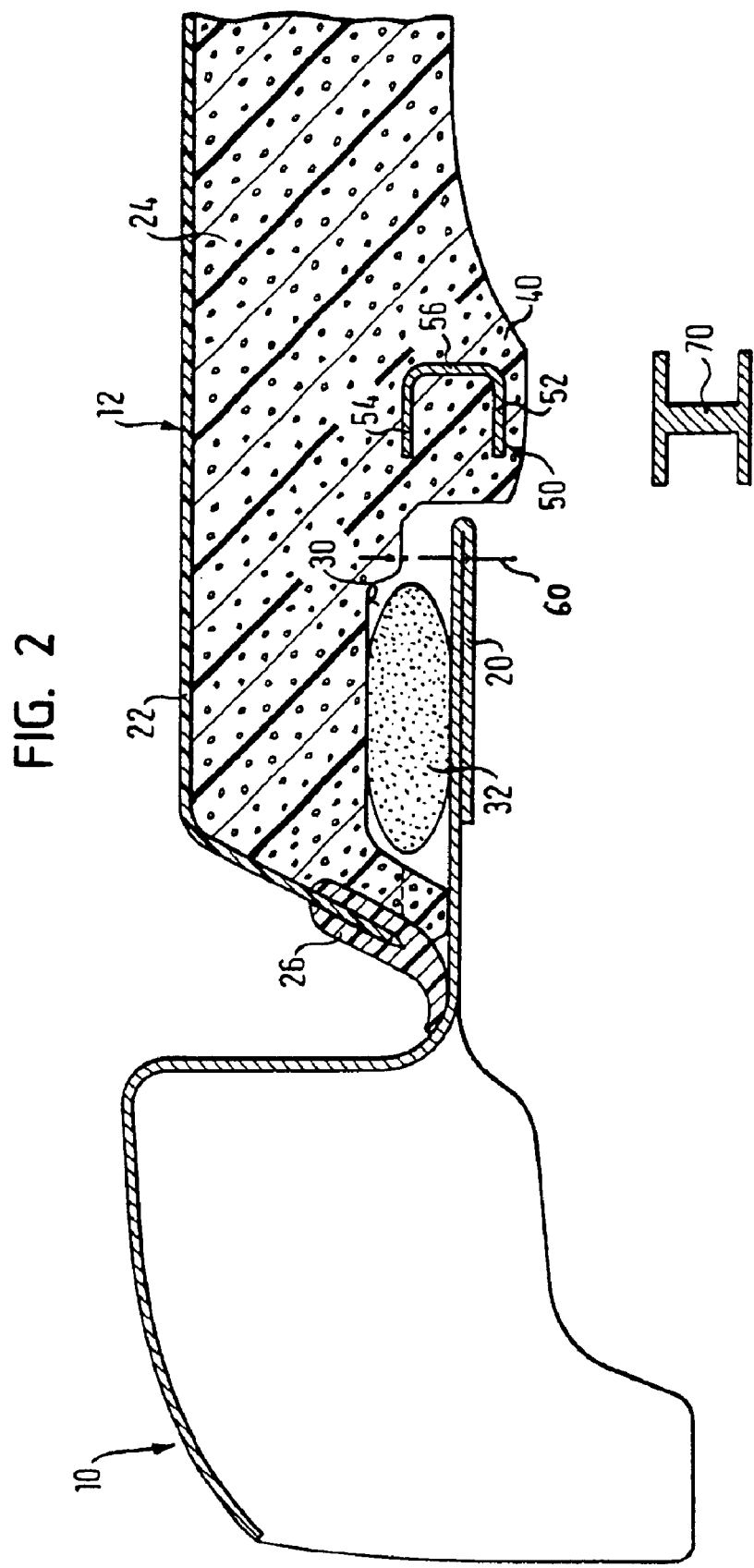
FIG. 2 is a section view taken along line II—II of the vehicle roof in an area of the connection between a roof frame and a roof module shown in FIG. 1.

As shown in FIG. 2, the roof frame, which may be made of sheet metal, has a hollow section that is closed, as seen in cross-section. An inwardly-pointing extension protrudes from the hollow section and is in the form of a plate-shaped, horizontal, flange-like edge 20 in this embodiment. The roof module 12 is placed onto the horizontal edge 20 from above. In one embodiment, the horizontal edge 20 advantageously runs continuously around the entire roof frame 10.

The roof module 12 has an exterior skin 22, which may be a deep-drawn plastic film having a foam backing 24 on its lower side. The foam backing 24 is preferably made of polyurethane foam or a similar material. A seal 26 may be disposed on the exterior edge of the roof module 12, the seal 26 being designed to assure a tightly sealed connection of the roof module 12 to the roof frame 10. The foam backing 24 in the area of the edge 20 has a groove-like recess 30 in which an adhesive bead 32 is disposed. The adhesive bead 32 may continuously surround the entire edge 20 and secure the roof module 12 to the edge 20. In addition, screws or other fasteners 60 may also secure the roof module 12 to the edge 20.

As shown in FIG. 2, the roof module 12 does not engage the roof frame 10 from underneath the roof frame 10 at any location, allowing the roof module 12 to simply be placed down onto the edge 20 from above.

Directly bordering the edge 20, the foam backing 24 has a bead 40 that protrudes downward such that the bead 40 lies lower than the edge 20. In the area of the bead 40, a hollow section having, for example, a C-shape or double-T shape 70 that is open to the edge 20 is completely embedded in the foam backing 24. The hollow section constitutes a safety element 50 that, in the event of a collision joins the roof frame to the roof module. A lower leg 52 of the safety element 50 (i.e., one portion of the safety element 50) extends along a plane that is below than the edge 20 and another portion, such as the upper leg 54, of the safety element 50 extends along a plane that is above the edge 20. As can be seen in FIG. 2, the safety element 50 does not directly border the edge 20 and instead is designed to catch the edge 20 if deformation of the roof frame 10 and/or the roof module 12 occurs. The safety element 50 forms a surrounding reinforcement profile of the roof module 12.

According to an alternative embodiment, safety element 50 can be fastened only along the side beam of the roof frame 10, i.e., extending only in the vehicle longitudinal direction. In this embodiment, it is possible in to optionally provide additional connecting braces between the two-sided, rail-shaped safety elements 50.

Figure 3:
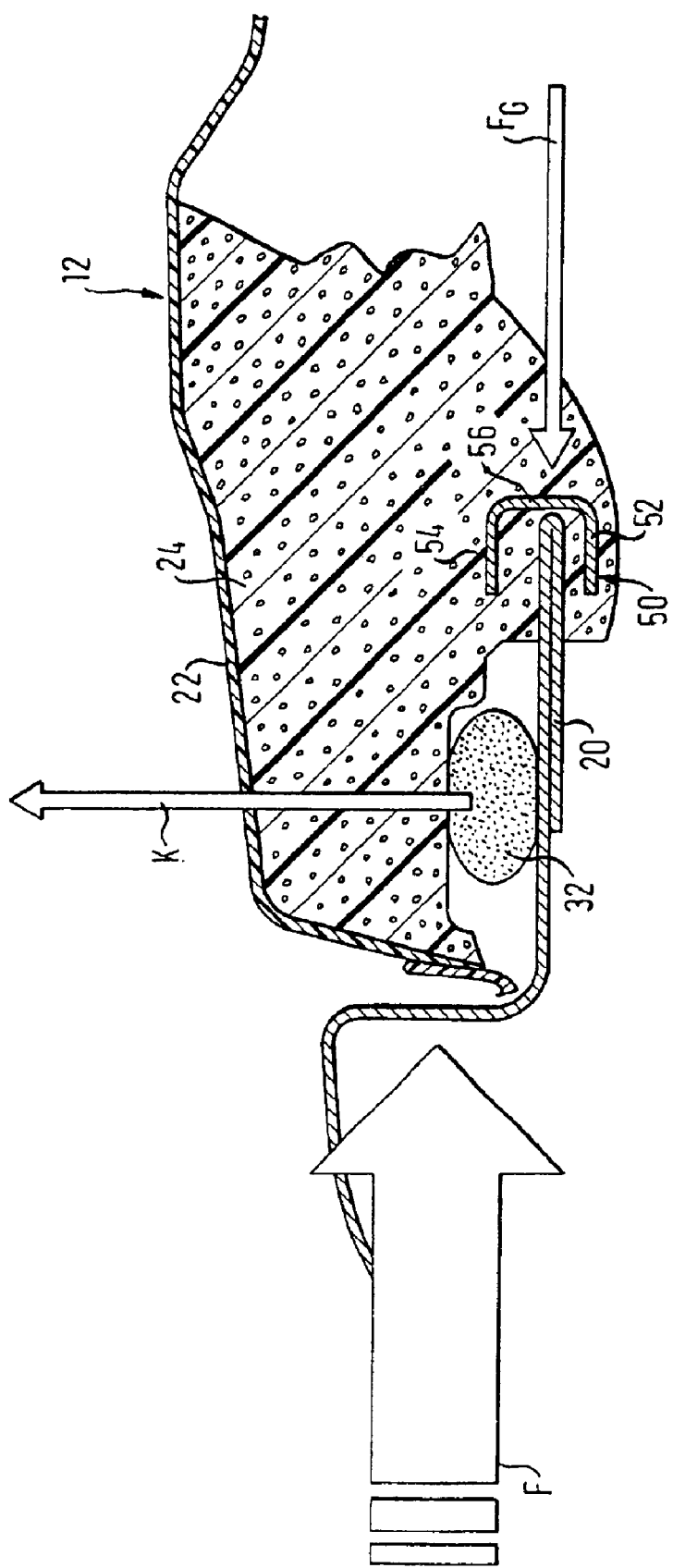
FIG. 3 is a section view of the area depicted in FIG. 2 with a roof frame that has been deformed by a pole impact test.

FIG. 3 illustrates the functioning of the safety element 50 during an impact. If a side impact occurs, which may be simulated by a so-called pole impact test, a horizontal, lateral force F is exerted on roof frame 10. The roof frame 10 is deformed laterally and horizontally, causing its edge 20 to be displaced laterally and horizontally. The edge 20 penetrates into the foam backing 24 and is received between the legs 52, 54 of the safety element 50. Note that it is possible for the edge 20, as a function of the intensity of force F, to contact a connecting bar 56 connecting the legs 52, 54 of the safety element 50.

If an upwardly-directed force K is exerted on the adhesive bead 32, bringing the adhesive bead 32 to the limits of its load bearing capability, the roof module 12 will not separate from the edge 20, because the safety element 50 additionally secures the roof module 12 in both the upward and downward directions. In addition, a counterforce FG that counteracts the force F is exerted by the safety element 50 of the roof module 12. The counterforce increases the stability of the entire roof.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A vehicle roof system, comprising:
   a roof frame having an inwardly pointing edge;
   a roof module permanently and fixedly attached to the roof frame; and
   a rigid safety element disposed in the roof module and having at least one portion extending toward the edge in a plane disposed below the edge.

2. The vehicle roof as recited in claim 1, wherein the safety element is spaced away from the edge during normal assembly of the roof frame and the roof module.

3. The vehicle roof as recited in claim 1, wherein the edge comprises a flange that is integrally formed with the roof frame as an inwardly-pointing extension of the roof frame.

4. The vehicle roof as recited in claim 3, wherein the flange is a plate-shaped sheet metal portion.

5. The vehicle roof as recited in claim 1, wherein the roof module is attached to the edge.

6. The vehicle roof as recited in claim 5, wherein the roof module is attached to the edge by an adhesive.

7. The vehicle roof as recited in claim 6, wherein the adhesive forms a continuous adhesive bead on the entire edge.

8. The vehicle roof as recited in claim 1, wherein the roof module is attached to the edge by at least one fastener.

9. The vehicle roof as recited in claim 1, wherein the safety element is a sheet metal part.

10. The vehicle roof as recited in claim 1, wherein the roof module comprises an exterior skin and a foam backing, wherein at least a portion of the safety element is embedded in the foam backing under the exterior skin.

11. The vehicle roof as recited in claim 10, wherein the safety element is completely embedded in the foam backing.

12. The vehicle roof as recited in claim 1, wherein the safety element has a hollow profile that is open towards the edge, the hollow portion receiving the edge in the event of a displacement of the edge toward the safety element.

13. The vehicle roof as recited in claim 12, wherein the safety element has a C-profile.

14. The vehicle roof as recited in claim 12, wherein the safety element has a double-T profile.

15. The vehicle roof as recited in claim 1, wherein the safety element is a surrounding reinforcement frame of the roof module.

16. The vehicle roof as recited in claim 15, wherein the reinforcement frame is continuous.

17. The vehicle roof as recited in claim 1, further comprising a seal that forms a sealed connection between the roof module and the roof frame.

18. A vehicle roof system, comprising:
   a roof frame having an inwardly pointing edge, the edge comprising a flange that is integrally formed with the roof frame; and
   a roof module permanently and fixedly attached to the flange by at least one of an adhesive and at least one fastener, the roof module having an exterior skin and a foam backing; and
   a rigid safety element at least partially embedded in the foam backing under the exterior skin, the safety element having first and second portions extending toward the flange, wherein the safety element is spaced away from the flange during normal assembly of the roof frame and the roof module, and wherein the first portion extends in a plane disposed below the flange and the second portion extends in a plane disposed above the flange to form hollow profile that is open towards the edge, the hollow portion receiving the edge in the event of a displacement of the edge toward the safety element.

19. The vehicle roof system as recited in claim 18, wherein the flange is formed from a plate-shaped sheet metal portion.

20. The vehicle roof system as recited in claim 18, wherein the adhesive forms a continuous adhesive bead on the entire edge.

21. The vehicle roof system as recited in claim 18, wherein the safety element is a sheet metal part.

22. The vehicle roof system as recited in claim 18, wherein the safety element is completely embedded in the foam backing.

23. The vehicle roof system as recited in claim 18, wherein the safety element has a C-profile.

24. The vehicle roof system as recited in claim 18, wherein the safety element has a double-T profile.

25. The vehicle roof system as recited in claim 18, wherein the safety element is a surrounding reinforcement frame of the roof module.

26. The vehicle roof system as recited in claim 18, wherein the reinforcement frame is continuous.

27. The vehicle roof system as recited in claim 18, further comprising a seal that forms a sealed connection between the roof module and the roof frame.

28. A vehicle roof system for a vehicle having a roof frame with an inwardly pointing edge, the system comprising:
   a roof module permanently and fixedly attached to the roof frame; and
   a rigid safety element disposed in the roof module and having at least one portion extending toward the edge in a plane disposed below the edge.

29. The vehicle roof system as recited in claim 28, wherein the safety element is spaced away from the edge during normal assembly of the roof frame and the roof module.

30. The vehicle roof system as recited in claim 28, wherein the roof module is attached to the edge.

31. The vehicle roof system as recited in claim 30, wherein the roof module is attached to the edge by an adhesive.

32. The vehicle roof system as recited in claim 31, wherein the adhesive forms a continuous adhesive bead on the entire edge.

33. The vehicle roof system as recited in claim 28, wherein the roof module is attached to the edge by at least one fastener.

34. The vehicle roof system as recited in claim 28, wherein the safety element is a sheet metal part.

35. The vehicle roof system as recited in claim 28, wherein the roof module comprises an exterior skin and a foam backing, wherein at least a portion of the safety element is embedded in the foam backing under the exterior skin.

36. The vehicle roof system as recited in claim 35, wherein the safety element is completely embedded in the foam backing.

37. The vehicle roof system as recited in claim 28, wherein the safety element has a hollow profile that is open towards the edge, the hollow portion receiving the edge in the event of a displacement of the edge toward the safety element.

38. The vehicle roof system as recited in claim 37, wherein the safety element has a C-profile.

39. The vehicle roof system as recited in claim 37, wherein the safety element has a double-T profile.

40. The vehicle roof system as recited in claim 28, wherein the safety element is a surrounding reinforcement frame of the roof module.

41. The vehicle roof system as recited in claim 28, wherein the reinforcement frame is continuous.

42. The vehicle roof system as recited in claim 29, further comprising a seal that forms a sealed connection between the roof module and the roof frame.

* * * * *